United States Patent Office.

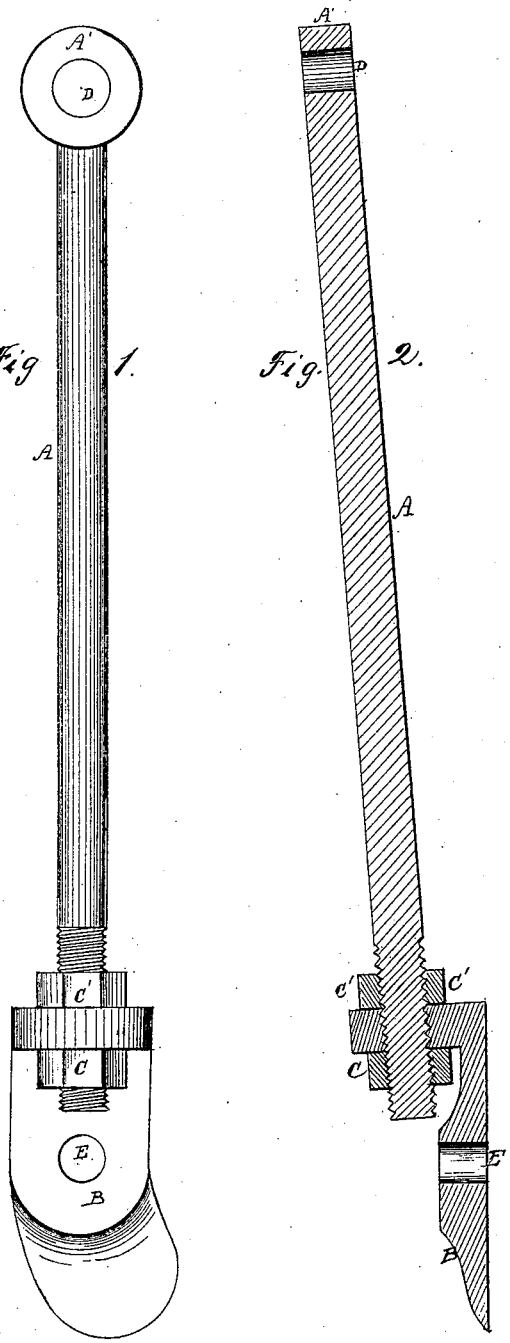

WILLIAM A. PARMELE, OF NEW HAVEN, CONNECTICUT, ASSIGNOR TO HIMSELF AND PHILIP P. AHREN, OF SAME PLACE.

Letters Patent No. 105,122, dated July 5, 1870.

IMPROVEMENT IN ADJUSTABLE LINKS FOR WATER-WHEEL GATES.

The Schedule referred to in these Letters Patent and making part of the same.

*To all whom it may concern:*

Be it known that I, WILLIAM A. PARMELE, of New Haven, in the county of New Haven and State of Connecticut, have invented an Improvement in Adjustable Links for Water-wheel Gates; and I do hereby declare that the following is a full, clear, and exact description thereof, reference being had to the accompanying drawing and to the letters of reference marked thereon.

*Drawing.*

Figure 1 is a plan or top view of my improved link, showing the adjustable rod, its nuts and knee to which it is attached.

Figure 2 is a central sectional elevation, showing the holes through which the bolts pass for securing it to the gates, and partially rotating ring upon the wheel.

Corresponding letters denote corresponding parts in both figures.

This invention relates to that class of devices which is used for adjusting the gates or valves which regulate the ingress of water to water-wheels; and It consists in the application of an adjustable rod, one end of which is secured adjustably to the gate or valve, while the other end is affixed to a properly formed device which is secured to a ring, which is attached to the wheel, and which partially rotates around the shaft thereof.

In constructing water-wheels, and, especially that class which receive the water upon their peripheries, and discharges it at a point within such peripheries, great difficulty has been found to exist in causing all of the gates or valves, which admit the water, to close tightly and at the same moment of time, so that no water should be allowed to waste through a portion of such gates or valves, while the other ones closed tightly upon their beds or seats.

One object is to provide a remedy for the above indicated evil by providing an adjustable rod for connecting the gates to a partially rotating ring, applied to some portion of the wheel, so that, as said ring is partially rotated, the gates or valves shall be acted upon simultaneously, and, by adjusting the rods connected to each to the proper length, all made to close tightly upon their beds at the same instant of time.

The construction and operation of this rod will be more fully described in that portion of this specification which follows.

A, in the drawing, represents a rod or bar of metal, which may be round or square, or of any other suitable form, except at its inner end, A', where it is to be made to receive a bolt, by having such end fastened, and by having a hole formed in it, as shown in the drawing, to receive a pin or bolt which secures it to the partially rotating ring.

The opposite end of this rod or bar is provided with a screw-thread, of a length sufficient to afford the means of lengthening or shortening such rod to the extent which may be necessary, to effect the proper adjustment of the gate or valve.

B represents a knee, which may be of cast metal and of the form shown in the drawing, or, it may be a stud screwed into the ring, having a hole bored through it for the reception of the rod A.

In whatever form this part of the device is constructed, it must be secured to the ring above alluded to in such a manner that as such ring is partially rotated it shall move with the same, and thus give the required movement to the rod, and through it to the gate or valve.

C C' represent nuts, which are to be fitted to the threaded end of the rod A, one upon each side of the vertical portion of the knee B, so that by turning them the length of the rod A may be regulated, so as to cause the proper adjustment of the gates.

Having thus described my invention,

What I claim and desire to secure by Letters Patent of the United States, is—

The bar A, in combination with the knee B, for use in connection with the gates or valves of a waterwheel, substantially as shown and described, and for the purposes specified.

In testimony whereof I have hereunto subscribed my name to this specification in the presence of two attesting witnesses, this 31st day of May, 1870.

WM. A. PARMELE.

Witnesses:
  CYPRIAN WILLCOX,
  MARCUS M. MARRINER.